United States Patent [19]

Omata

[11] Patent Number: 5,091,266
[45] Date of Patent: Feb. 25, 1992

[54] SOFT-MAGNETIC FILM HAVING SATURATION MAGNETIC-FLUX DENSITY AND MAGNETIC HEAD UTILIZING THE SAME

[75] Inventor: Yuuji Omata, Ibaraki, Japan

[73] Assignee: Matsushita Electric Industrial Co., Ltd., Osaka, Japan

[21] Appl. No.: 400,921

[22] Filed: Aug. 30, 1989

[30] Foreign Application Priority Data

Sep. 2, 1988 [JP] Japan .................. 63-220935

[51] Int. Cl.$^5$ .................................................. G11B 21/00
[52] U.S. Cl. ................................... 428/692; 360/125; 428/611; 428/678; 428/900; 428/928
[58] Field of Search ............... 428/611, 694, 900, 678, 428/680, 681, 692; 360/110, 125, 126; 204/192.2

[56] References Cited

U.S. PATENT DOCUMENTS

| | | | |
|---|---|---|---|
| 4,410,603 | 10/1983 | Yamamori et al. | 428/611 |
| 4,780,781 | 10/1988 | Sano et al. | 360/126 |
| 4,833,044 | 5/1989 | Takahashi et al. | 428/900 |
| 4,921,763 | 5/1990 | Karamon | 204/192.2 |

FOREIGN PATENT DOCUMENTS

| | | |
|---|---|---|
| 60-25014 | 2/1985 | Japan . |
| 61-126618 | 6/1986 | Japan . |
| 61-158017 | 7/1986 | Japan . |
| 62-202307 | 8/1987 | Japan . |
| 62-204504 | 9/1987 | Japan . |

Primary Examiner—Paul J. Thibodeau
Attorney, Agent, or Firm—Stevens, Davis, Miller & Mosher

[57] ABSTRACT

Disclosed is a soft-magnetic film having high saturation magnetic-flux density. The soft-magnetic film is made of an alloy containing as its main components Fe, Co and Ni in the proportion: $20\% < Fe < 75\%$, $5\% < Co < 45\%$ and $20\% < Ni < 70\%$ (at %) and has a structure in which (110) or (111) planes of a face-centered cubic-lattice structure are given to its thin-film surface, as a preferred crystallographic orientation. The thin-film alloy may contain less than 5% of Cr, Ti, Zr, Hf or the like. The thin film of this alloy is formed by evaporation, electroplating or the like.

7 Claims, 4 Drawing Sheets

ENLARGED VIEW OF
MAGNETIC-GAP SECTION A

SOFT-MAGNETIC FILM HAVING SATURATION MAGNETIC-FLUX DENSITY AND MAGNETIC HEAD UTILIZING THE SAME

BACKGROUND OF THE INVENTION

This invention relates to a soft-magnetic film having high saturation magnetic-flux density as well as to a magnetic head utilizing this film (including a thin-film magnetic head).

Recording mediums for high-density magnetic recording/reproduction (or writing/reading) are required to have high coercive force (Hc), whereas materials for magnetic-recording heads are required to have high saturation magnetic-flux density (Bs). Conventionally, there have been available only limited kinds of soft-magnetic head materials exhibiting high Bs values: Fe-system and Co-system amorphous alloys as well as Sendust alloys may be mentioned as examples of such materials. Alloys of the above-mentioned types which exhibit around 10,000 Gauss for practical use are known. These alloys can provide low coercive force (Hc) and high magnetic permeability ($\mu i$) as well as high saturation magnetic-flux density.

In order to realize more efficient magnetic recording-/reproduction, materials exhibiting still higher Bs values must be used. In this regard, amorphous alloy films of Fe-system are inadequate since they do not easily allow a sufficiently low magnetostriction to be obtained Besides, they have great difficulty providing satisfactory stability in soft-magnetic properties when heat-treated. Amorphous materials of Co-system alloys allow a sufficiently low magnetostriction to be realized. In addition, some of them can provide satisfactory stability for heat treatment. However, the maximum Bs value they can provide is at most around 14,000 Gauss. From the practical point of view, those having high Bs values are still inadequate in stability for heat treatment As for Sendust-alloy thin films, they are relatively free from the problem of inadequate thermal stability. However, the soft-magnetic properties they can provide are by no means sufficient, the maximum practical Bs value they exhibit is at most in the range 11,000 to 12,000 Gauss.

For practical use, head materials are required which exhibit a Bs value of 15,000 Gauss or more and which have satisfactory soft-magnetic properties (low coercive force (Hc), high initial permeability ($\mu i$) and low magnetostriction ($\lambda s$)).

Various reports have been made on the magnetic properties of Fe-Co-Ni ternary alloy system which are known as "Perminvar Alloys". However, these alloys are restricted to bulk (solid) materials. As to their soft-magnetic properties, substantially nothing is known about the properties of thin-film materials which generally exhibit considerable surface orientation even when the composition is the same.

Thin alloy-films containing as their main components Fe, Co and Ni are referred to here. The films are manufactured by evaporation or electrodeposition and have a face-centered cubic-lattice structure. As shown in FIG. 1, the saturation magnetic-flux density of such thin films depends principally on the amount of Ni atoms; when Ni<70 at%, a soft-magnetic thin film exhibiting a Bs value of above 12,000 can be obtained. This Bs value is not to be attained with conventional soft-magnetic thin films. However, if Ni≦20 at%, the face-centered cubic-lattice structure has no stability at room temperature, whereas the body-centered cubic-lattice structure becomes stable, which quite adversely affects the soft-magnetic properties of the thin film. As shown in FIG. 2, this also applies to the case where Fe≧75 at% (i.e., 20<Ni<70 [%] and Fe<75% are the requisite conditions).

Normally, the crystal magnetic anisotropy constant and magnetostriction constant greatly influence the soft-magnetic properties. They not only depend on the alloy element composition, but differ greatly both in absolute value and sign in accordance with the incrystallographic-plane value. Furthermore, they depend in general greatly on the surface orientation of the thin-film material as well as the grain size and grain configuration thereof Accordingly, the data on these thin films differ from that on the above-mentioned conventional alloys in the form of bulk materials even when the composition is the same.

SUMMARY OF THE INVENTION

It is an object of this invention to provide a thin film of an alloy which contains as its main components Fe, Co and Ni in the proportion: 20%<Fe<75%, 5%<Co<45% and 20%<Ni<70% (at%) and in which (110) or (111) planes of a face-centered cubic-lattice structure are given priority in the surface orientation of its thin-film surface (or in which (110) or (111) planes, as a preferred orientation, of a face-centered structure are given to its thin-film surface)

With thin-film manufacturing methods such as sputtering evaporation, electron beam evaporation, or electro-plating, it is possible to realize a thin film of ternary system of alloys containing Fe, Co and Ni as main components on whose thin-film surface priority is given to (110) or (111) planes of a face-centered cubic-lattice structure. This can be effected by selecting appropriate manufacturing conditions. Satisfactory soft-magnetic properties have been ascertained in a thin-film surface exhibiting such a surface orientation. At the same time it has been found out that a thin film of an alloy must have the composition: Ni>20 at%, Fe>20 at% and Co<45 at% before its surface can provide satisfactory soft-magnetic properties. With a composition in the above-mentioned range, an initial magnetic permeability of $\mu i > 300$ and a coercive force of Hc<3 Oe can be obtained by appropriately controlling the surface orientation as well as the grain size and grain configuration. When Co≦5 at%, the thin film obtained will be substantially identical with those materials which have conventionally been known as thin films of an Ni-Fe-type alloy such as Permalloy Alloy.

As indicated in the examples below, an alloy containing the above three elements Fe, Co and Ni as the principal components can naturally provide satisfactory soft-magnetic properties if a traceable amount (less than 5%) of at least one of Cr, Ti, Zr, Hf or the like is added thereto with a view to controlling the grain size of the Co crystals which serve to improve the anti-corrosion property of the film. The soft-magnetic properties in that case are substantially equivalent to or higher than those when no fourth element is added as long as the addition does not greatly affect the orientation. This arrangement does not involve any great deterioration in Bs value.

BRIEF DESCRIPTION OF THE DRAWINGS

FIG. 4b is a sectional view taken along the line IVG-IVB of FIG. 4a.

DETAILED DESCRIPTION OF THE PREFERRED EMBODIMENTS

Embodiments of this invention will now be described with reference to the accompanying drawings.

Figure 1:
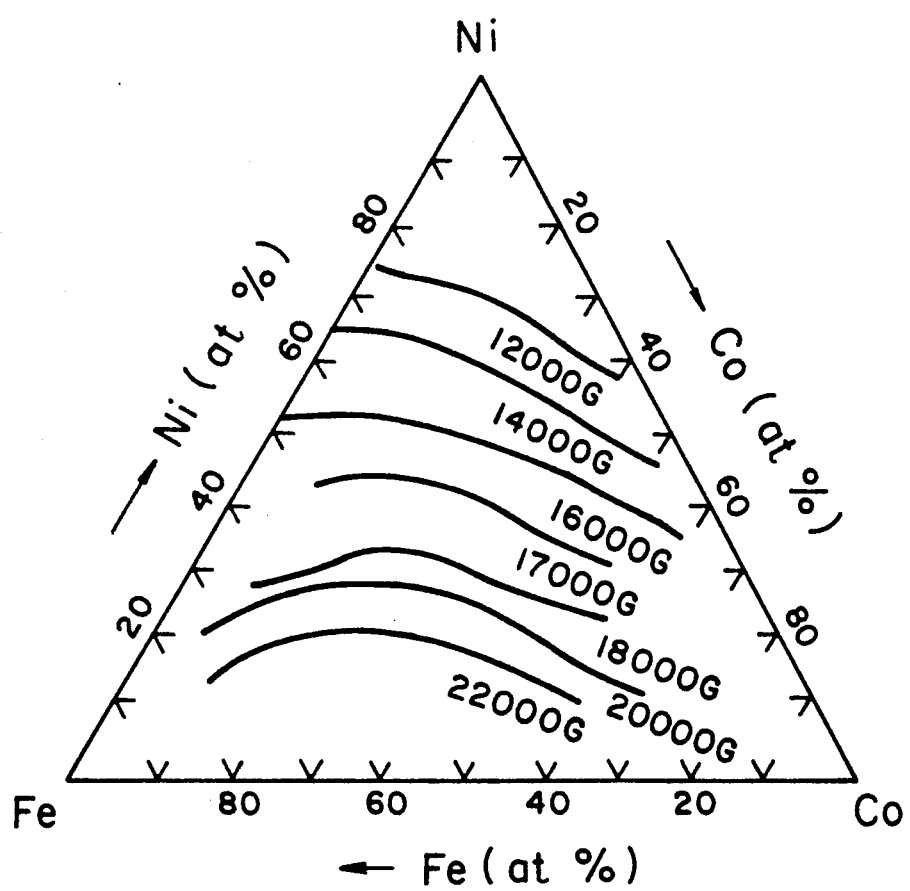
FIG. 1 is a graph showing the dependence upon different compositions of the main components Fe, Co and Ni of high-saturation-flux-density soft-magnetic films in accordance with a fist embodiment of this invention.

FIG. 1 shows the dependence on composition (at%) of high-saturation-flux-density soft-magnetic films in accordance with the first embodiment of this invention containing Fe, Co and Ni as their main components.

The properties shown in FIG. 1 are all those of films manufactured by sputtering evaporation.

Figure 2:
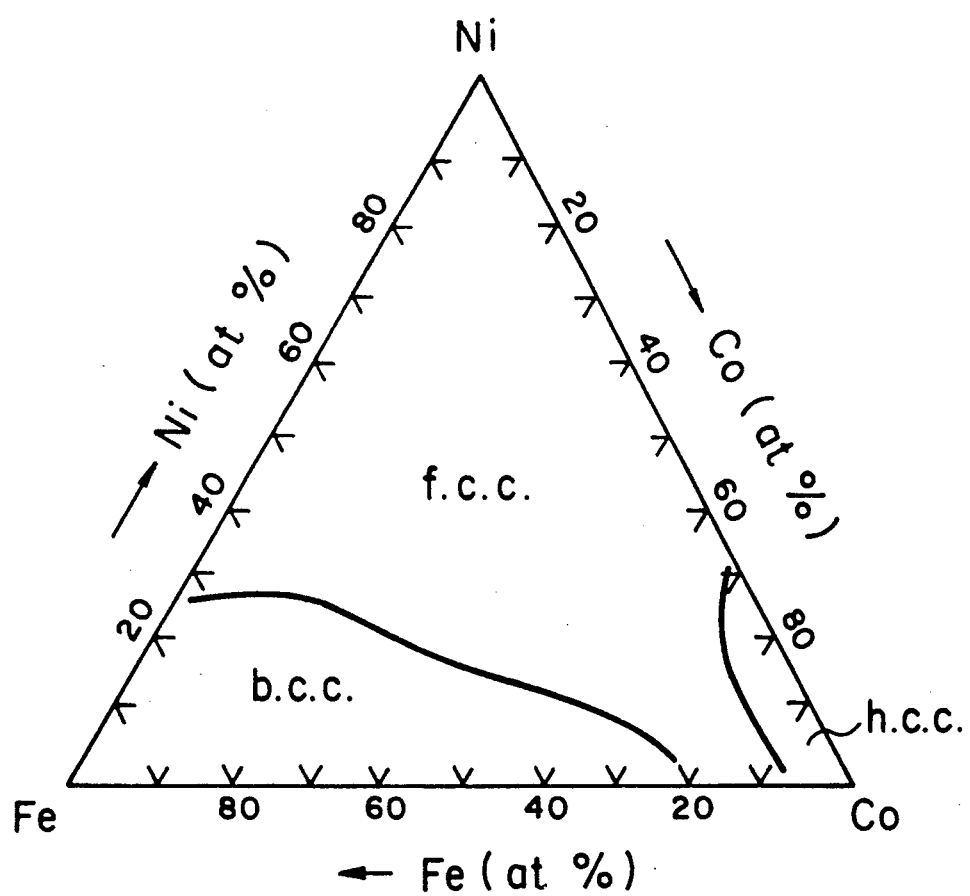
FIG. 2 is a graph showing the crystal structures at room temperature of the sputtering-evaporation films before heat treatment.

FIG. 2 shows the results of an investigation of the crystal structures of the evaporation films before heat treatment. The investigation was made on the specimens shown in FIG. 1.

Table 1 shows the soft-magnetic properties, such as the initial magnetic permeability ($\mu i$) and the coercive force (Hc), of the different crystal structures ascertained from the results shown in FIG. 2, in comparison to the thin-film surface orientations. The properties are those of heat-treated films, ascertained under conditions of 700° C. and 0.5 Hr or 500° C. and 0.5 Hr. Here, the specimens were all air-cooled after heat treatment.

Principally, the high-saturation-flux-density soft-magnetic films in accordance with this invention are all based on face-centered cubic structures. Accordingly, as is well known, when X-ray diffraction is performed on them, no diffraction line is to be observed as a result of the interference effect of the diffraction X-ray, except where all the diffraction indices (h, k, l) consist of even numbers (including 0) or odd numbers.

As will be appreciated from the results shown in Table 1, the fact that (220) diffraction lines generally exhibit a great magnitude indicates that (110) planes exhibit a large inclination to surface orientation with respect to the evaporation film surfaces.

TABLE 1

| Manufacturing Method | Composition (at %) | Heat-Treatment Method (Air-Cooling) | Initial Permeability $\mu i$ | Coercive Force Hc (Oe) | Predominant X-Ray-Diffraction-Line Indices | Evaluation |
| --- | --- | --- | --- | --- | --- | --- |
| Sputtering Evaporation | $Fe_{59.5}Co_{10.5}Ni_{30}$ | 500° C. 0.5 hr | 900 | 3.0 | (220) | ○ |
| | $Fe_{49}Co_{21}Ni_{30}$ | " | 800 | 3.0 | (220) | ○ |
| | $Fe_{52.5}Co_{22.5}Ni_{25}$ | " | 800 | 3.0 | (220) and (111) | ○ |
| | $Fe_{45}Co_{30}Ni_{25}$ | " | 1200 | 2.0 | (220) | ○ |
| | $Fe_{42}Co_{28}Ni_{30}$ | " | 700 | 3.0 | (220) | ○ |
| | $Fe_{35}Co_{35}Ni_{30}$ | " | 500 | 3.0 | (220) | ○ |
| | $Fe_{37.5}Co_{37.5}Ni_{25}$ | " | 700 | 1.0 | (111) | ○ |
| | $Fe_{32}Co_{43}Ni_{25}$ | " | 500 | 1.3 | (111) | △ |
| | $Fe_{22.5}Co_{52.5}Ni_{25}$ | " | 300 | 2.5 | (111) | △ |
| | $Fe_{30}Co_{35}Ni_{35}$ | 700° C. 0.5 hr | 250 | 3.5 | f.c.c f.c.c. h.c.p mixed | X |
| | $Fe_{30}Co_{60}Ni_{10}$ | " | 300 | 3.0 | (111) | △ |
| Sputtering Evaporation | $Fe_{50}Co_{30}Ni_{20}$ | 700° C. 0.5 hr | less than 100 | 15.0 | (b.c.c) | X |
| | $Fe_{30}Co_{10}Ni_{60}$ | " | 900 | 3.0 | (220) | ○ |
| | $Fe_{35}Co_{30}Ni_{35}$ | " | 1000 | 2.0 | (111) and (220) | ○ |
| | $Fe_{35}Co_{20}Ni_{45}$ | " | 1500 | 1.8 | (220) | ○ |
| | $Fe_{35}Co_{20}Ni_{45}$ | 700° C. 0.5 hr | 1700 | 1.0 | (111) and (220) | ○ |
| | $Fe_{20}Co_{35}Ni_{45}$ | 500° C. 0.5 hr | 200 | 5.0 | (111) and (200) | X |
| | $Fe_{45}Co_{20}Ni_{35}$ | 700° C. 0.5 hr | 2100 | 1.0 | (220) | ○ |
| | $Fe_{14}Co_{56}Ni_{30}$ | " | less than 100 | 3.6 | (111) | X |
| Electro-Deposition | $Fe_{29}Co_{7}Ni_{64}$ | No heat treatment | 900 | 2.5 | (111) | ○ |
| Sputtering Evaporation | $Fe_{43}Co_{19}Ni_{34}Cr_4$ | 700° C. 0.5 hr | 1500 | 1.5 | (220) | ○ |
| | $Fe_{42}Co_{18}Ni_{35}Ti_4$ | " | 800 | 3.0 | (111) and (220) | ○ |
| | $Fe_{43}Co_{19}Ni_{35}Zr_3$ | " | 1100 | 3.0 | (111) | ○ |
| | $Fe_{43}Co_{19}Ni_{35}Hf_3$ | " | 600 | 3.0 | (111) | △ |

*1 f.c.c: face-centered cubic-lattice structure
*2 b.c.c: body-centered cubic-lattice structure
*3 h.c.p: hexagonal close-packed structure
*4 A symbol ○ means the properties of a film are good.
*5 A symbol △ means the properties of a film are rather good.
*6 A symbol X means the properties of a film are inferior.

Figure 3A:
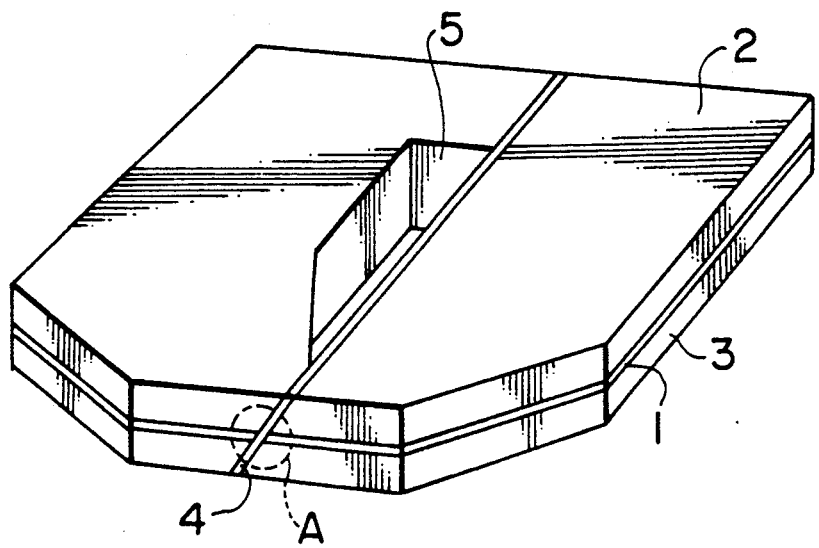
FIG. 3a is a schematic perspective view of a laminated video head in accordance with a second embodiment of this invention.
Figure 3B:
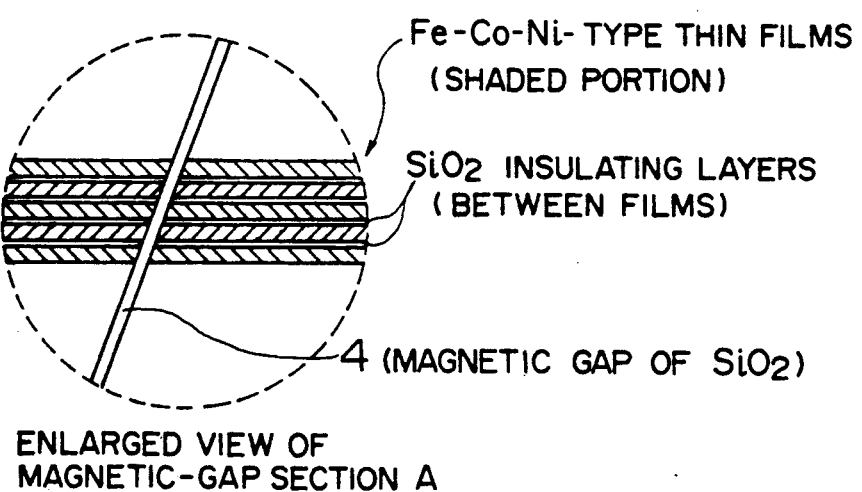
FIG. 3b is an enlarged sectional view of the magnetic-gap section of the same.

FIGS. 3a and 3b show a laminated video head core using a sputtering-evaporation film in accordance with the second embodiment of this invention which contain Fe, Co and Ni as its main components and which has a high saturation magnetic-flux density. Satisfactory magnetic-recording/reproduction properties were obtained with this laminated video-head core. The video head shown consists of two laminated bodies each of which includes a magnetic core layer 1 sandwiched between non-magnetic substrates 2 and 3, the laminated bodies being positioned face to face through magnetic gaps 4 provided in them. The reference numeral 5 indicates a window for coiling.

Figure 4A:
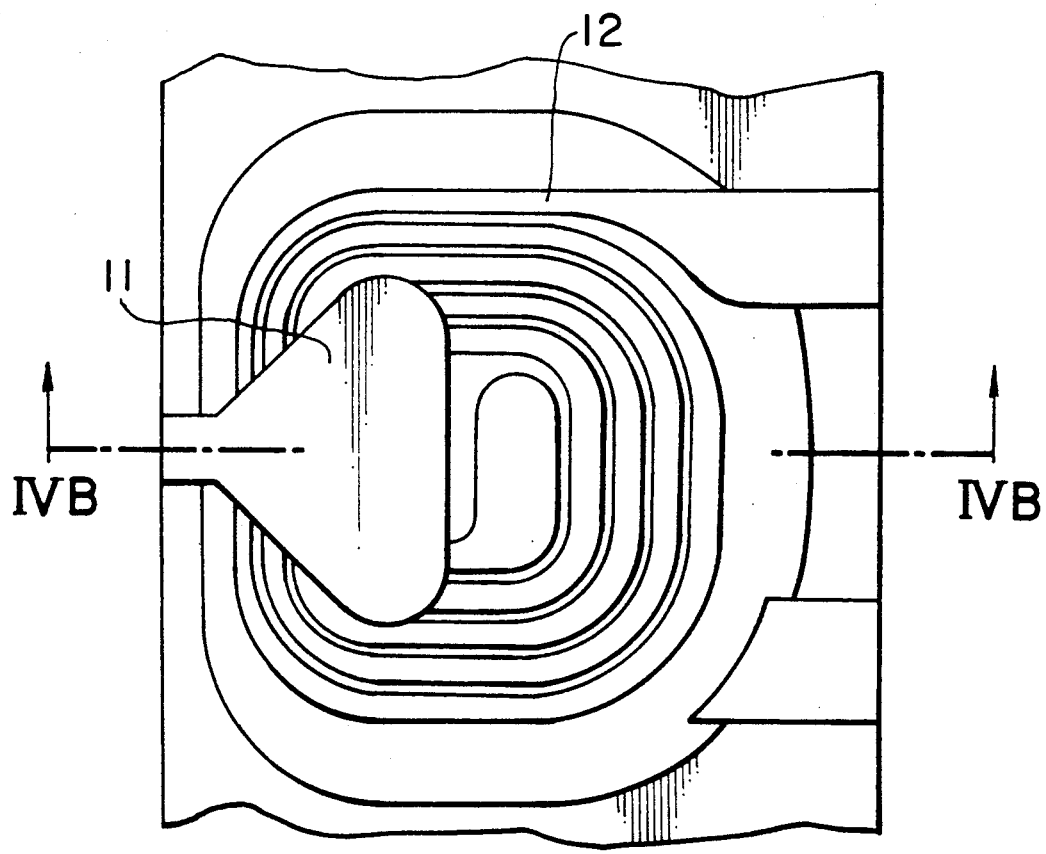
FIG. 4a is a plan view of a thin-film magnetic head in accordance with a third embodiment of this invention.
Figure 4B:
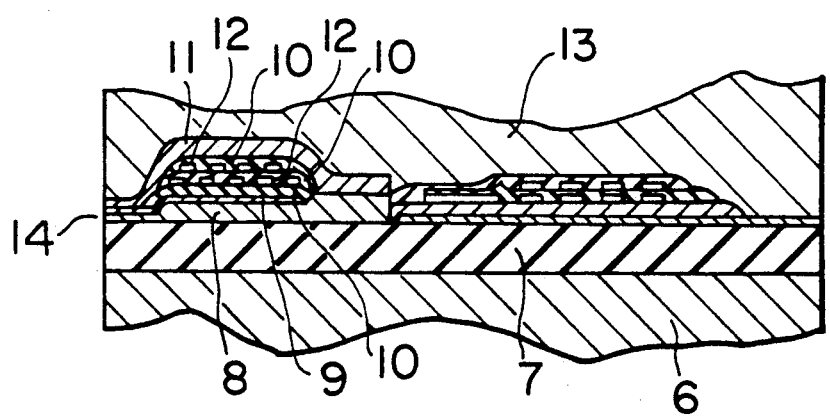

FIGS. 4a and 4b show a thin-film magnetic head including a lower and a higher magnetic thin film layers used as a yoke material. The layers were soft magnetic alloy-films in accordance with the third embodiment of this invention which contain Fe, Co and Ni as its main components and which exhibit a high saturation magnetic flux density. The films, also, were electroplated in a uniaxial magnetic field. Satisfactory magnetic-recording/reproduction properties were obtained with this thin-film magnetic head The head shown includes a substrate 6 and a lower magnetic layer 8 formed on it with an insulating layer 7 therebetween. It further includes a gap layer 9 formed on the lower magnetic layer 8, an insulating layer 20, a coil layer 12, and an upper magnetic layer 11, the layers being laminated one on top of the other in this order. In the tip-end section 14, the lower and upper magnetic layers 8 and 11 face each other with only the gap layer therebetween. The reference numeral 13 indicates a protective layer.

As will be apparent from the above description, this invention proposes a soft-magnetic film having high saturation magnetic-flux density. This soft-magnetic film helps to realize various type of magnetic heads which provide improve magnetic-recording/reproduction efficiency.

What is claimed is:
1. A soft-magnetic film having high saturation magnetic-flux density made of an alloy containing as its main components Fe, Co and Ni in the proportion: $20\% < Fe < 75\%$, $5\% < Co < 45\%$ and $20\% < Ni 70\%$ (atomic %) and having a face-centered cubic structure which has (110) or (111) planes as a preferential crystallographic orientation.

2. A soft-magnetic film having high saturation magnetic-flux density as claimed in claim 1, wherein a thin film of an alloy containing Fe, Co and Ni as its main components is prepared by evaporation.

3. A soft-magnetic film having high saturation magnetic-flux density as claimed in claim 1, wherein a thin film of an alloy containing Fe, Co and Ni as its main components is prepared by electroplating.

4. A soft-magnetic film having high saturation magnetic-flux density as claimed in claim 1, wherein less than 5 atomic % of at least one of Cr, Ti, Zr or Hf is added to a thin-film alloy containing Fe, Co and Ni as its main components.

5. A magnetic head comprising a soft-magnetic film having a high saturation magnetic-flux density made of an alloy containing as its main components Fe, Co and Ni in the proportion: $20\% < Fe < 75\%$, $5\% < Co < 45\%$ and $20\% < Ni 70\%$ (atomic %) and having a face centered cubic structure which has (110) or (111) planes as a preferential crystallographic orientation.

6. A soft-magnetic film having high saturation magnetic-flux density as claimed in claim 1, wherein the alloy is composed essentially of, by atomic %, 20 to 75% of Fe, 5 to 45% of Co and 20 to 70% of Ni.

7. A magnetic head according to claim 5, wherein the alloy is composed essentially of, by atomic %, 20 to 75% of Fe, 5 to 45% of Co and 20 to 70% of Ni.

* * * * *